United States Patent [19]
Woods

[11] 4,098,294
[45] Jul. 4, 1978

[54] FLOW CONTROL VALVE

[76] Inventor: John B. Woods, 1755 E. 61st Pl., Tulsa, Okla. 74136

[21] Appl. No.: 732,592

[22] Filed: Oct. 15, 1976

[51] Int. Cl.² ............................ F17D 1/00; F15D 1/00
[52] U.S. Cl. ............................ 137/614.11; 137/625.31; 137/625.35
[58] Field of Search ..................... 137/614.11, 625.31, 137/625.35

[56] References Cited
U.S. PATENT DOCUMENTS

| 1,495,870 | 5/1924 | O'Donnell et al. ......... 137/625.31 X |
| 2,568,084 | 9/1951 | Mockridge ..................... 137/614.11 |
| 3,135,293 | 6/1964 | Hulsey ............................ 137/625.31 |

Primary Examiner—Edgar W. Geoghegan
Attorney, Agent, or Firm—Dunlap, Codding & McCarthy

[57] ABSTRACT

A flow control valve having means within the valve body for forming simultaneously variable inlet and outlet orifices which are separated by an expansion chamber.

11 Claims, 8 Drawing Figures

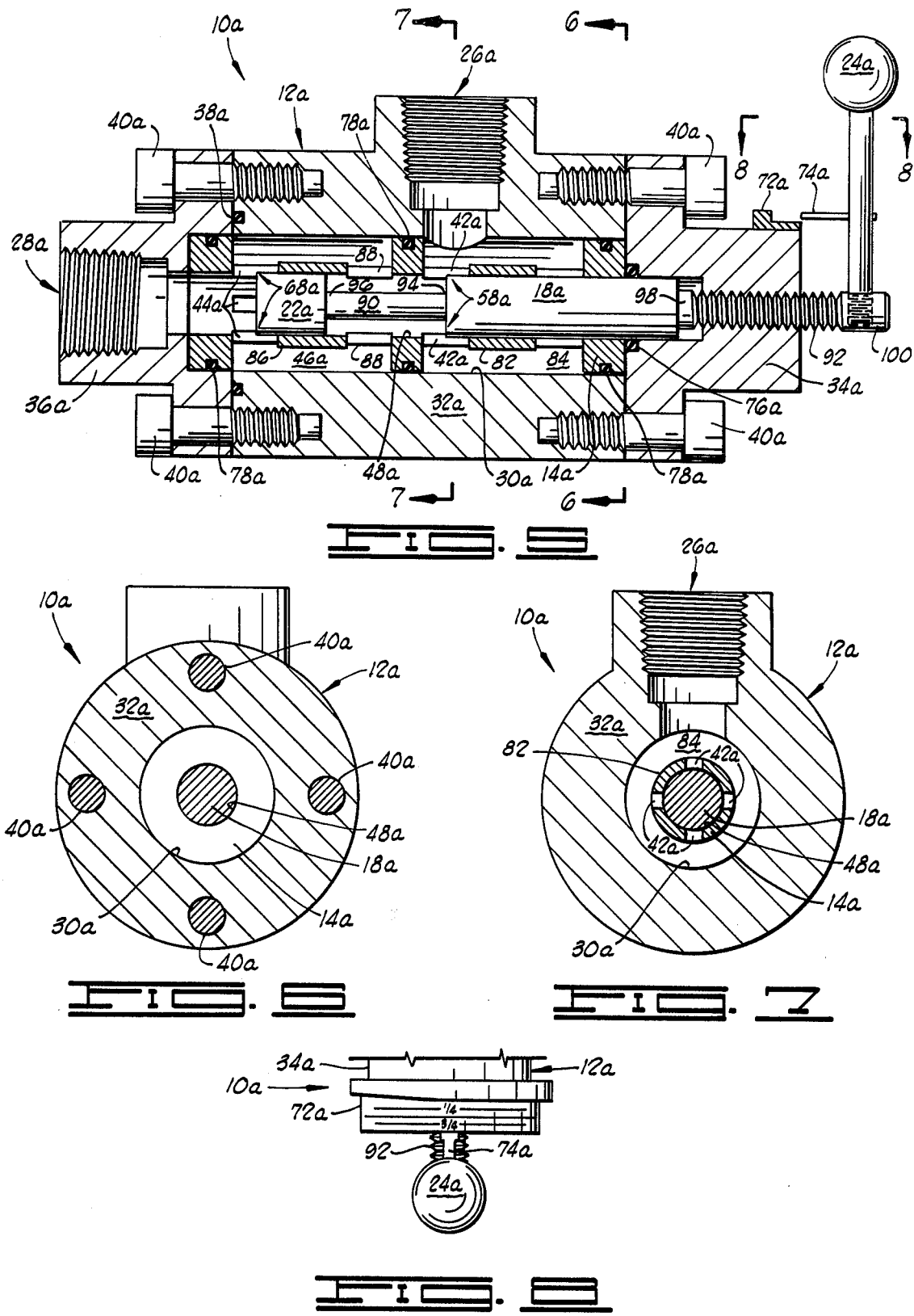

FLOW CONTROL VALVE

BACKGROUND OF THE INVENTION

1. Field of the Invention

This invention relates generally to improvements in flow control valves and, more particularly, but not by way of limitation, to a flow control valve having means within the valve body for forming simultaneously variable inlet and outlet orifices which are separated by an expansion chamber.

2. Description of the Prior Art

In the past, flow control valves have been generally constructed to have either a single variable orifice or at most a single set of simultaneously variable orifices. The species of flow control valves having a single orifice may be fairly represented by the apparatus shown in the following U.S. Pat. Nos.: 2,590,290; 2,912,011; 3,067,768; and 3,865,139. The species of flow control valves generally referred to as "multiple orifice valves" but which have only a single set of simultaneously variable orifices may be fairly represented by the apparatus shown in the following U.S. Pat. Nos.: 39,795; 1,192,689; 1,495,870; 1,738,135; 2,100,366; 3,026,899; 3,207,181; and 3,426,797.

While such valves are generally satisfactory in most flow control applications, it is common practice when severe cavitation is anticipated to utilize such valves in series since no single valve satisfactorily provides the necessary pressure drops. However, such series-connected valves are extremely awkward in operation and require extensive additional apparatus to accomplish precision flow control.

SUMMARY OF THE INVENTION

The present invention contemplates a flow control valve having means within the valve body for forming simultaneously variable inlet and outlet orifices which are separated by an expansion chamber.

An object of the invention is to provide a flow control valve capable of handling large pressure drops.

Another object of the invention is to provide a flow control valve facilitating precise flow control over large ranges of flows and pressures.

Still another object of the invention is to provide a flow control valve having inlet and outlet orifices formed from easily replaceable elements.

Yet another object of the invention is to provide a flow control valve which retards cavitation by accomplishing a large pressure drop in at least two stages.

Other objects and advantages of the invention will be evident from the following detailed description when read in conjunction with the accompanying drawings which illustrate various embodiments of the invention.

BRIEF DESCRIPTION OF THE DRAWINGS

FIG. 5 is a cross-sectional view of a flow control valve constructed in accordance with an alternate embodiment of the present invention.

FIG. 6 is a cross-sectional view of the flow control valve shown in FIG. 5 taken along the line 6—6 of FIG. 5.

FIG. 7 is a cross-sectional view of the flow control valve shown in FIG. 5 taken along the line 7—7 of FIG. 5.

FIG. 8 is a partial top plan view of the flow control valve shown in FIG. 5 taken along the line 8—8 of FIG. 5.

DESCRIPTION OF THE PREFERRED EMBODIMENT

Figures 1, 2, 3, 4:
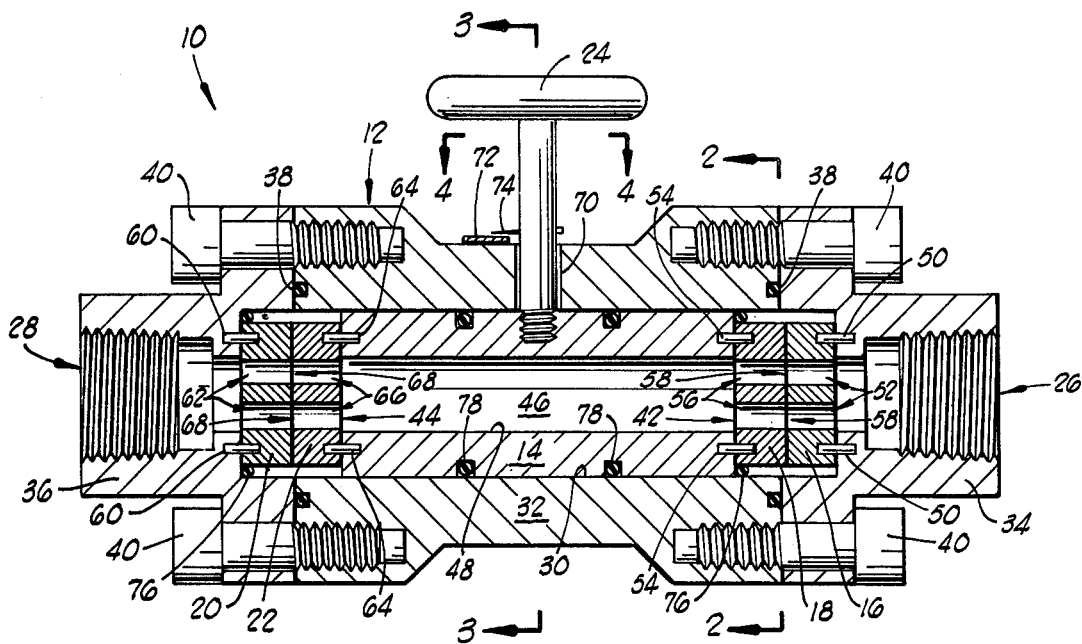
FIG. 1 is a cross-sectional view of a flow control valve constructed in accordance with the preferred embodiment of the present invention.
FIG. 2 is a cross-sectional view of the flow control valve shown in FIG. 1 taken along the line 2—2 of FIG. 1.
FIG. 3 is a cross-sectional view of the flow control valve shown in FIG. 1 taken along the line 3—3 of FIG. 1.
FIG. 4 is a partial top plan view of the flow control valve shown in FIG. 1 taken along the line 4—4 of FIG. 1.

Referring to the drawings in general and to FIGS. 1 through 4 in particular, shown therein and referred to by the general reference number 10 is a flow control valve of the disc type constructed in accordance with the preferred embodiment of the present invention. The flow control valve 10 is comprised primarily of the valve body 12, a sleeve 14, a first inlet disc 16, a second inlet disc 18, a first outlet disc 20, a second outlet disc 22, and a handle 24.

The valve body 12 has a threaded inlet port 26, a threaded outlet port 28, and a cylindrical bore 30 extending therethrough between the inlet and outlet ports 26 and 28, respectively. More particularly, the valve body 12 is comprised of a housing 32, an inlet end fitting 34, and an outlet end fitting 36, the end fittings 34 and 36 being sealingly connected to the housing 32 via a pair of O-rings 38 and a plurality of fasteners 40.

The sleeve 14, which is substantially cylindrical in shape, is disposed in the bore 30 through the valve body 12 for rotation about the longitudinal axis of the sleeve 14. The sleeve 14 has an inlet port 42 adjacent to the inlet port 26 of the valve body 12, an outlet port 44 adjacent to the outlet port 28 of the valve body 12, and an expansion chamber 46 formed therein by a bore 48 extending axially therethrough between the inlet and outlet ports 42 and 44, respectively, of the sleeve 14.

The first inlet disc 16 is connected to the valve body 12 across the bore 30 therethrough between the inlet port 26 of the valve body 12 and the inlet port 42 of the sleeve 14 via a plurality of removable retaining pins 50. The first inlet disc 16 has at least one hole 52 extending therethrough in fluid communication with the inlet port 26 of the valve body 12. The holes 52 have a total cross-sectional area less than the cross-sectional area of the expansion chamber 46 with the longitudinal axis of a hole 52 being parallel to but radially offset from the rotational axis of the sleeve a distance greater than the radius of the hole 52.

The second inlet disc 18 is connected to the sleeve 14 across the inlet port 42 of the sleeve 14 via a plurality of removable retaining pins 54. The second inlet disc 18 is preferably sized to slideably engage the first inlet disc 16 and form a substantially fluid-tight seal therewith. The second inlet disc 18 has at least one hole 56 extending therethrough which is sized and positioned substantially the same as a corresponding hole 52 through the first inlet disc 16, but in fluid communication with the inlet port 42 of the sleeve 14. As will be clear to those skilled in the art, each hole 52 through the first inlet disc 16 effectively defines an inlet orifice 58, with the second inlet disc 18 being rotatable with the sleeve 14 relative to the first inlet disc 16 in the manner of an inlet valve to vary the cross-sectional area of the portion of the inlet orifices 58 providing fluid communication between the inlet port 26 and the expansion chamber 46.

Since the vena cava will generally be formed from 0.4 to 1 times the diameter of the inlet port 26 downstream of the inlet orifices 58 depending upon the position of the second inlet disc 18 relative to the first inlet disc 16, it has been determined that the expansion chamber 46 should have a length at least four times the diameter of the inlet port 26 in order to allow the fluid flowing from the inlet port 26 into the expansion chamber 46 to achieve a relatively normal flow pattern before exiting from the expansion chamber 46.

The first outlet disc 20 is connected to the valve body 12 across the bore 30 therethrough between the outlet port 28 of the valve body 12 and the outlet port 44 of the sleeve 14 via a plurality of removable retaining pins 60. The first outlet disc 20 has at least one hole 62 extending therethrough sized and positioned substantially the same as a corresponding hole 52 through the first inlet disc 16 but in fluid communication with the outlet port 28 of the valve body 12.

The second outlet disc 22 is connected to the sleeve 14 across the outlet port 44 of the sleeve 14 via a plurality of removable retaining pins 64. The second outlet disc 22 is preferably sized to slideably engage the first outlet disc 20 and form a substantially fluid-tight seal therewith. The second outlet disc 22 has at least one hole 66 extending therethrough which is sized and positioned substantially the same as a corresponding hole 52 through the first inlet disc 16. As will be clear to those skilled in the art, each hole 62 through the first outlet disc 20 effectively defines an outlet orifice 68, with the second outlet disc 22 being rotatable with the sleeve 14 relative to the first outlet disc 20 in the manner of an outlet valve to vary the cross-sectional area of the portion of the outlet orifices 68 providing fluid communication between the expansion chamber 46 and the outlet port 28.

To facilitate simultaneous rotation of the second inlet and outlet discs 18 and 22, respectively, via the sleeve 14, the housing 32 of the valve body 12 is provided with an arcuate slot 70 extending radially through the valve body 12 from the medial portion of the bore 30. In addition, the sleeve 14 has the valve actuating handle 24 connected thereto and extending through the slot 70 through the valve body 12. In the preferred embodiment, a scale 72 is connected to the housing 32 of the valve body 12 adjacent to the slot 70 and the handle 24 is provided with a perpendicularly extending indicator 74, the scale 72 and indicator 74 cooperating to provide a visual indication of the flow position of the orifices 58 and 68 comprising the flow control valve 10.

In order to prevent undesirable fluid leakage through the valve body 12 via the interface between the sleeve 14 and the bore 30 through the valve body 12, appropriately sized O-rings 76 may be interposed between valve body 12 and the circumferences of the second inlet disc 18 and the first outlet disc 20. In addition, a pair of appropriately sized O-rings 78 may be disposed circumferentially around the sleeve 14 on either side of the handle 24 to prevent fluid leakage through the slot 70.

In the preferred embodiment, the discs 16, 18, 20, and 22, are formed from a suitable erosion resistant material such as ceramic or Tungsten Carbide. However, in the event that the discs 16, 18, 20, or 22 become seriously worn, they may be easily replaced merely by removing the fasteners 40 and withdrawing the housing 32 from between the inlet and outlet end fittings 34 and 36, respectively.

As will be clear to those skilled in the art, the flow control valve 10 can be easily modified for operation in a system wherein the fluid flow is from the outlet port 28 to the inlet port 26 merely by interposing appropriately sized O-rings between the valve body 12 and the circumferences of the first inlet disc 16 and the second outlet disc 22. Of course, such a modification would be appropriate if the flow control valve 10 were used in a dual-directional flow system.

DESCRIPTION OF THE ALTERNATE EMBODIMENT

Shown in FIGS. 5 through 8 and referred to by the general reference number 10a is a flow control valve of the spool type constructed in accordance with an alternate embodiment of the present invention. The flow control valve 10a is comprised primarily of a valve body 12a, a sleeve 14a, and a spool valve assembly 80.

The valve body 12a has an inlet port 26a which is disposed substantially perpendicular to an outlet port 28a, and a cylindrical bore 30a extending radially therethrough from the outlet port 28a across the inlet port 26a. More particularly, the valve body 12a is comprised of a housing 32a, an inlet end fitting 34a, and an outlet end fitting 36a, the end fittings 34a and 36a being connected to the housing 32a via a plurality of fasteners 40a, with an O-ring 38a being disposed generally between the housing 32a and the outlet end fitting 36a.

The sleeve 14a, which is substantially cylindrical in shape, is disposed in the bore 30a through the valve body 12a. The sleeve 14a has a first circumferential groove 82 adjacent to the inlet port 26a of the valve body 12a defining an inlet chamber 84 in fluid communication with the inlet port 26a of the valve body 12a. The sleeve 14a also has a second circumferential groove 86 generally between the inlet and outlet ports 26a and 28a, respectively, of the valve body 12a forming an expansion chamber 46a.

The sleeve 14a has a cylindrical bore 48a extending axially therethrough in fluid communication with the outlet port 28a of the valve body 12a. The sleeve 14a has at least one inlet port 42a extending radially through the sleeve 14a from the bore 48a into the inlet chamber 84, with the inlet ports 42a having a total cross-sectional area less than the cross-sectional area of the expansion chamber 46a. The sleeve 14a also has at least one communication port 88 extending radially through the sleeve 14a from the bore 48a into the end of the expansion chamber 46a nearest the inlet chamber 84, with the communication ports 88 preferably having a total cross-sectional area on the order of the cross-sectional area of the expansion chamber 46a. In addition, the sleeve 14a has at least one outlet port 44a extending radially through the sleeve 14a from the bore 48a into the end of the expansion chamber 46a nearest the outlet port 28a of the valve body 12a, the outlet ports 44a being sized and positioned substantially the same as the inlet ports 42a. As will be clear to those skilled in the art, the inlet and outlet ports 42a and 44a, respectively, effectively define inlet and outlet orifices 58a and 68a, respectively, with the communication ports 88 facilitating fluid flow between the inlet orifice 58a and the expansion chamber 46a.

The spool valve assembly 80 is comprised primarily of an inlet spool valve 18a, an outlet spool valve 22a, a connecting rod 90, an actuating rod 92, and a handle 24a. The inlet spool valve 18a is slideably disposed in the bore 48a in the sleeve 14a so as to be slideable across the inlet ports 42a defining the inlet orifices 58a to vary the cross-sectional area of the portion of the inlet orifices 58a providing fluid communication between the inlet port 26a and the expansion chamber 46a. The outlet spool valve 22a is slideably disposed in the bore 48a in the sleeve 14a so as to be slideable across the outlet ports 44a defining the outlet orifices 68a to vary the cross-sectional area of the portion of the outlet orifices 68a providing fluid communication between the expansion chamber 46a and the outlet port 28a.

Since the vena cava will generally be formed from 0.4 to 1 times the diameter of the inlet port 26a downstream of the inlet orifices 58a depending upon the position of the inlet spool valve 18a relative to the inlet ports 42a, it has been determined that the expansion chamber 46a should have a length at least four times the diameter of the inlet port 26a in order to allow the fluid flowing from the inlet port 26a into the expansion chamber 46a to achieve a relatively normal flow pattern before exiting from the expansion chamber 46a.

The connecting rod 90 is disposed in the bore 48a through the sleeve 14a with one end 94 thereof being connected to the inlet spool valve 18a and an opposite end 96 thereof being connected to the outlet spool valve 22a. The actuating rod 92 is also disposed in the bore 48a through the sleeve 14a, with one end 98 thereof being connected to the inlet spool valve 18a and an opposite end 100 thereof being disposed outside the valve body 12a.

To facilitate simultaneous movement of the inlet and outlet spool valves 18a and 22a, respectively, via the connecting rod 90 and the actuating rod 92, the actuating rod 92 is threaded through the inlet end fitting 34a of the valve body 12a. In addition, the actuating rod 92 has the valve actuating handle 24a perpendicularly connected to the end 100 thereof. In the alternate embodiment, a scale 72a is connected to the inlet end fitting 34a of the valve body 12a adjacent to the handle 24a and the handle 24a is provided with a perpendicularly extending indicator 74a, the scale 72a and indicator 74a cooperating to provide a visual indication of the flow position of the orifices 58a and 68a comprising the flow control valve 10a.

In order to prevent undesirable fluid leakage through the valve body 12a via the interface between the sleeve 14a and the bore 30a through the valve body 12a, appropriately sized O-rings 78a may be interposed therebetween at the middle and each end of the sleeve 14a. In addition, an appropriately sized O-ring 76a may be disposed circumferentially between the inlet spool valve 18a and the inlet end fitting 34a to prevent fluid leakage through the inlet fitting 34a.

In the preferred form of the alternate embodiment, the inlet and outlet spool valves 18a and 22a, respectively, are integrally formed with the connecting rod 90 and the actuating rod 92 from a suitable erosion resistant material. However, in the event that the inlet and outlet spool valves 18a and 22a, respectively, become seriously worn, they may be easily replaced merely by removing the fasteners 40a connecting the inlet end fitting 34a to the housing 32a. As will be clear to those skilled in the art, the flow control valve 10a needs no modification to be operative in a system wherein the fluid flow is from the outlet port 28a to the inlet port 26a. Of course, no modification will be necessary for the flow control valve 10a to be operative in a dual-directional flow system.

Changes may be made in a construction and the arrangement of the parts or the elements of the various embodiments as disclosed herein without departing from the spirit and scope of invention as defined in the following claims.

What is claimed is:

1. A flow control valve comprising:

a valve body having an inlet port, an outlet port, a cylindrical bore extending therethrough between the inlet and outlet ports of the valve body, and an arcuate slot extending radially through the valve body from the medial portion of the cylindrical bore;

means connected to the valve body between the inlet and outlet ports thereof for forming an expansion chamber having a length at least four times the diameter of the inlet port, said means having an inlet orifice providing fluid communication between the inlet port and the expansion chamber, and an outlet orifice providing fluid communication between the expansion chamber and the outlet port, the cross-sectional area of each of the inlet and outlet orifices being less than the cross-sectional area of the expansion chamber, said means comprising:

a cylindrical sleeve disposed in the bore through the valve body for rotation about the longitudinal axis of the sleeve, the sleeve having an inlet port adjacent to the inlet port of the valve body, an outlet port adjacent to the outlet port of the valve body, and a bore extending axially therethrough between the inlet and outlet ports of the sleeve;

a first inlet disc connected to the valve body across the bore therethrough between the inlet port of the valve body and the inlet port of the sleeve, the first inlet disc having an inlet-orifice defining hole extending therethrough in fluid communication with the inlet port of the valve body, the hole having a cross-sectional area less than the cross-sectional area of the expansion chamber with the longitudinal axis of the hole being parallel to but radially offset from the rotational axis of the sleeve a distance greater than the radius of the hole; and a first outlet disc connected to the valve body across the bore therethrough between the outlet port of the valve body and the outlet port of the sleeve, the first outlet disc having an outlet-orifice defining hole extending therethrough sized and positioned the same as the hole through the first inlet disc but in fluid communication with the outlet port of the valve body;

inlet valve means movably disposed in the valve body adjacent to the inlet orifice for varying the cross-sectional area of the portion of the inlet orifice providing fluid communication between the inlet port and the expansion chamber, said inlet valve means comprising:

a second inlet disc connected to the sleeve across the inlet port of the sleeve, the second inlet disc being sized to slidably engage the first inlet disc and having a hole extending therethrough sized and positioned the same as the hole through the first inlet disc but in fluid communication with the inlet port of the sleeve;

outlet valve means movably disposed in the valve body adjacent to the outlet orifice for varying the cross-sectional area of the portion of the outlet orifice providing fluid communication between the expansion chamber and the outlet port, the outlet valve means comprising:

a second outlet disc connected to the sleeve across the outlet port of the sleeve, the second outlet disc being sized to slideably engage the first outlet disc and having a hole extending therethrough sized and positioned the same as the hole through the first inlet disc but in fluid communication with the outlet port of the sleeve; and valve actuating means connected to the inlet and outlet valve means for simultaneously moving the inlet and outlet valve means by equal amounts, the valve actuating means comprising:

a handle connected to the sleeve and extending through the slot through the valve body.

2. The flow control valve of claim 1 wherein the first inlet and outlet discs are further characterized as being removably connected to the valve body, and wherein the second inlet and outlet discs are further characterized as being removably connected to the sleeve.

3. The flow control valve of claim 1 wherein the first and second inlet and outlet discs are ceramic.

4. The flow control valve of claim 1 wherein the first and second inlet and outlet discs are Tungsten Carbide.

5. The flow control valve of claim 1 further defined to include:

sealing means for preventing fluid leakage between the sleeve and the valve body.

6. A flow control valve comprising:

a valve body having an outlet port, an inlet port disposed substantially perpendicular to the outlet port, and a cylindrical bore extending axially therethrough from the outlet port across the inlet port;

means connected to the valve body between the inlet and outlet ports thereof for forming an expansion chamber having a length at least four times the diameter of the inlet port, said means having an inlet orifice providing fluid communication between the inlet port and the expansion chamber, and an outlet orifice providing fluid communication between the expansion chamber and the outlet port, the cross-sectional area of each of the inlet and outlet orifices being less than the cross-sectional area of the expansion chamber, said means comprising:

a sleeve disposed in the bore through the valve body, the sleeve having a first circumferential groove adjacent to the inlet port of the valve body defining an inlet chamber in fluid communication with the inlet port of the valve body, a second circumferential groove between the inlet and outlet ports of the valve body forming the expansion chamber, a cylindrical bore extending axially through the sleeve in fluid communication with the outlet port of the valve body, and a communication port extending radially through the sleeve from the bore into the end of the expansion chamber nearest the inlet chamber, the inlet orifice being defined by an inlet port extending radially through the sleeve from the bore into the inlet chamber and the outlet orifice being defined by a port extending radially through the sleeve from the bore into the end of the expansion chamber nearest the outlet port of the valve body;

inlet valve means movably disposed in the valve body adjacent to the inlet orifice for varying the cross-sectional area of the portion of the inlet orifice providing fluid communication between the inlet port and the expansion chamber, the inlet valve means comprising:

an inlet spool valve slideably disposed in the bore in the sleeve, the inlet spool valve being slideable across the port defining the inlet orifice;

outlet valve means movably disposed in the valve body adjacent to the outlet orifice for varying the cross-sectional area of the portion of the outlet orifice providing fluid communication between the expansion chamber and the outlet port, the outlet valve means comprising:

an outlet spool valve slideably disposed in the bore in the sleeve, the outlet spool valve being slideable across the port defining the outlet orifice; and valve actuating means connected to the inlet and outlet valve means for simultaneously moving the inlet and outlet valve means by equal amounts, the valve actuating means comprising:

a connecting rod disposed in the bore through the sleeve with one end of the connecting rod being connected to the inlet spool valve and an opposite end thereof being connected to the outlet spool valve;

an actuating rod disposed in the bore through the sleeve and the bore through the valve body with one end of the actuating rod being connected to the inlet spool valve and an opposite end thereof being disposed outside the valve body; and a handle connected to the end of the actuating rod outside the valve body.

7. The flow control valve of claim 6 wherein the inlet and outlet spool valves, the connecting rod and the actuating rods are integrally formed.

8. The flow control valve of claim 6 wherein the actuating rod is further characterized as being threaded through the valve body.

9. The flow control valve of claim 6 further defined to include:

sealing means for preventing fluid leakage between the sleeve and the valve body.

10. The flow control valve of claim 6 further defined to include:

indicating means for providing visual indicia of the flow positions of the inlet and outlet orifices of the flow control valve.

11. The flow control valve of claim 1 further defined to include:

indicating means for providing visual indicia of the flow positions of the inlet and outlet orifices of the flow control valve.

* * * * *